US012558285B2

(12) United States Patent
Carrasco Uribarren et al.

(10) Patent No.: US 12,558,285 B2
(45) Date of Patent: Feb. 24, 2026

(54) SYSTEM FOR THE ASSESSMENT AND TREATMENT OF THE CERVICAL SPINE

(71) Applicant: UNIVERSIDAD INTERNACIONAL DE CATALUNYA, FUNDACIÓ PRIVADA (ES), Barcelona (ES)

(72) Inventors: Andoni Carrasco Uribarren, Sant Cugat de Vallès (ES); Sara Cabanillas Barea, Sant Cugat de Vallès (ES); Xavier Marimon Serra, Sant Cugat de Vallès (ES); Alejandro Ernesto Portela Otaño, Sant Cugat de Vallès (ES); Pere-Ramón Rodríguez Rubio, Sant Cugat de Vallès (ES); Román Pérez Antoñanzas, Sant Cugat de Vallès (ES)

( * ) Notice: Subject to any disclaimer, the term of this patent is extended or adjusted under 35 U.S.C. 154(b) by 87 days.

(21) Appl. No.: 18/700,622

(22) PCT Filed: Oct. 13, 2022

(86) PCT No.: PCT/ES2022/070644

§ 371 (c)(1),
(2) Date: Apr. 11, 2024

(87) PCT Pub. No.: WO2023/062264

PCT Pub. Date: Apr. 20, 2023

(65) Prior Publication Data

US 2024/0407964 A1 Dec. 12, 2024

(30) Foreign Application Priority Data

Oct. 15, 2021 (ES) .................................. 202130966

(51) Int. Cl.
*A61H 1/02* (2006.01)

(52) U.S. Cl.
CPC ........ *A61H 1/0296* (2013.01); *A63B 2220/51* (2013.01); *A63B 2220/833* (2013.01)

(58) Field of Classification Search
CPC ........ A61H 1/0296; A61H 1/008; A61H 1/02; A63B 2220/51; A63B 2220/833; A63B 2220/56; A63B 23/025
See application file for complete search history.

(56) References Cited

U.S. PATENT DOCUMENTS 4,699,126 A * 10/1987 Lancaster ................ A61H 1/00
601/102
4,768,779 A * 9/1988 Oehman, Jr. ........ A63B 23/025
482/901

(Continued)

*Primary Examiner* — Garrett K Atkinson
(74) *Attorney, Agent, or Firm* — Eugenio J. Torres-Oyola; Victor M. Rodriguez-Reyes; Rafael Rodriguez-Muriel

(57) ABSTRACT

A system for the assessment and treatment of the cervical spine is provided. The system comprises a sliding platform formed by two plates, a first plate, fixed, which is arranged on a surface when the user is performing a head movement exercise, and a second plate, movable, for supporting the head during said exercise, wherein the two plates are coupled together using at least one guiding element; and a distance sensor for determining a sliding value of the second plate relative to the first plate during the exercise and/or a pneumatic system for determining the value of the force exerted with the head during the exercise, the pneumatic.

17 Claims, 2 Drawing Sheets

(56) References Cited

U.S. PATENT DOCUMENTS

| | | | | |
|---|---|---|---|---|
| 7,803,095 | B1 * | 9/2010 | LaGree | A63B 22/0089<br>482/121 |
| 8,876,665 | B1 * | 11/2014 | Isom | A63B 23/025<br>482/93 |
| 11,896,870 | B2 * | 2/2024 | Smith | A61B 5/6822 |
| 2004/0220500 | A1 * | 11/2004 | Dahl | A61H 1/0218<br>601/25 |
| 2007/0272010 | A1 * | 11/2007 | O'Leary | A63B 23/025<br>73/379.01 |
| 2012/0295771 | A1 * | 11/2012 | LaGree | A63B 22/203<br>482/94 |
| 2013/0196835 | A1 * | 8/2013 | Solow | A63B 21/159<br>482/142 |
| 2014/0094721 | A1 * | 4/2014 | Diallo | A63B 24/0087<br>601/5 |
| 2014/0121076 | A1 * | 5/2014 | Lagree | A63B 21/023<br>482/123 |
| 2016/0101011 | A1 * | 4/2016 | Swenson | A61H 1/0296<br>482/10 |
| 2017/0189775 | A1 * | 7/2017 | Dunno, Jr. | A63B 69/0002 |
| 2020/0069998 | A1 * | 3/2020 | Smith | A63B 24/0003 |
| 2025/0041146 | A1 * | 2/2025 | Tang | A61H 1/0222 |

* cited by examiner

SYSTEM FOR THE ASSESSMENT AND TREATMENT OF THE CERVICAL SPINE

FIELD OF THE INVENTION

This invention concerns a system (or device) for the assessment and the treatment of the cervical spine.

The invention allows to carry out an assessment of the movement and/or of the force of the musculature of the cervical spine comfortably, quickly, safely, and reliably. The invention may be used for the treatment of the cervical spine in the presence of a physical therapist or autonomously and unsupervised, by the patients themselves.

BACKGROUND OF THE INVENTION

The cervical spine is one of the most movable regions of the body and it must be strong enough to support the weight and the movement of the head. The deep cervical musculature is responsible for providing stability to the cervical segments. The strength deficit of this musculature is related with different clinical profiles. These two characteristics of the cervical spine, the movement and the deep musculature force, cannot currently be assessed jointly and with one single tool.

Patent application KR20180104916A describes an apparatus for the treatment of the cervical spine where a movable part slides relative to a fixed part by means of a guide or rail. The upper area of the movable part comprises an ergonomic shape for an improved support of the head.

Utility model CN2798879Y discloses another apparatus for the treatment of the cervical spine that allows for the adjustment of the pulling force depending on the patient's reaction.

Documents RU2299046C1, RU2366396C1, RU2612842C1, FR3063213A1, and US20060184082A1 disclose other devices/systems for the treatment of the cervical spine.

New systems (or devices) are required for the assessment and the treatment of the cervical spine, which, in addition, allow to exercise, in a guided manner with a therapist or autonomously, the different aspects and qualities of the cervical spine both in healthy subjects and subjects with some type of dysfunction.

DISCLOSURE OF THE INVENTION

Embodiments of the present invention provide a system (or device) for the assessment and the treatment of the cervical spine including a sliding platform formed by two plates, a first plate, fixed, which is arranged on a surface when the user (or patient) is performing a head movement exercise, and a second plate, movable, for supporting the head during the exercise. The two plates are coupled together by at least one guiding element.

Likewise, the system includes a distance sensor for determining a sliding (or shifting) value of the second plate relative to the first plate during the exercise, and/or a pneumatic system for determining the value of the force exerted with the head during the exercise, the pneumatic system including a two-chamber cylinder.

In particular, the two plates of the sliding platform have planar geometry and identical dimensions. This is not to be considered limiting since in some embodiments, the second plate can have an ergonomic shape for an improved support of the head of the user during the performance of the exercise.

In the proposed system, the pneumatic system is calibrated and can provide the measurements in Newtons or in mmHg. Likewise, the system allows calculating the movement of the head, in degrees, taking into account the sliding of the second plate on the first plate.

In an embodiment, each one of the two plates includes, embedded or embossed therein, a number of measurement reference markings.

In an embodiment, the distance sensor is an imaging element.

In another embodiment, the distance sensor comprises an optical sensor. In this case, the optical sensor comprises a light-emitting element and a light-receiving element. In particular, the light-emitting element is arranged in or on the first plate and the light-receiving element is arranged in or on the second plate.

In another embodiment, the distance sensor comprises a magnetic or capacitive linear encoder. The linear encoder can include a sensing element and a magnetic/capacitive strip. The sensing element can be arranged in or on the first plate and the magnetic strip can be arranged in or on the second plate.

In yet another embodiment, the distance sensor comprises an inertial sensor.

In some embodiments, the system further includes an electronic control unit (or electronic module) configured for collecting the sliding value determined and transmitting it to a computing device, for example, a PC, a server, a smartphone device, etc.

In an embodiment, the two-chamber cylinder comprises an outlet for each of the chambers, each outlet including a "T-shaped" connector, and one of the pathways of each "T-shaped" connector including a manual flow controller.

In an embodiment, the pneumatic system further includes a pressure-measuring instrument operatively connected to another of the pathways of the "T-shaped" connector.

In some embodiments, the at least one guiding element is formed by the two-chamber cylinder itself.

In a particular embodiment, the system includes the distance sensor, the pneumatic system and, in addition, an electronic control unit (or electronic control module). In this particular case, the distance sensor can comprise an optical sensor or a (magnetic, capacitive, or inertial) linear encoder. The pneumatic system can further comprise one or more of: a pressure sensor, a flow control valve and/or an air pump. The two-chamber cylinder can comprise an outlet for each one of the chambers, each outlet including a "T-shaped" connector, and one of the pathways of each "T-shaped" connector including a manual flow controller, and another of the pathways including a pressure sensor. Alternatively, the two-chamber cylinder can comprise an outlet for each one of the chambers, each outlet including a "T-shaped" connector, referred to as first and second "T-shaped" connectors. One of the pathways of the first and second "T-shaped" connectors includes a flow control valve and another of the pathways of the first and second "T-shaped" connectors includes another "T-shaped" connector, referred to as third and fourth "T-shaped" connectors. Likewise, one of the pathways of the third and/or fourth "T-shaped" connectors includes a pressure sensor and another of the pathways of the third and fourth "T-shaped" connectors includes an aperture/closure valve operatively connected to an air pump.

In some embodiments, the second plate is covered, at least on the surface for supporting the head, with a mechanical pressure-sensitive conductive sheet.

BRIEF DESCRIPTION OF THE DRAWINGS

The foregoing and other characteristics and advantages will be more fully understood from the following detailed description, merely illustrative and non-limiting, of a number of exemplary embodiments with reference to the attached drawings, wherein.

DETAILED DESCRIPTION OF THE INVENTION AND EXEMPLARY EMBODIMENTS

Figure 1:
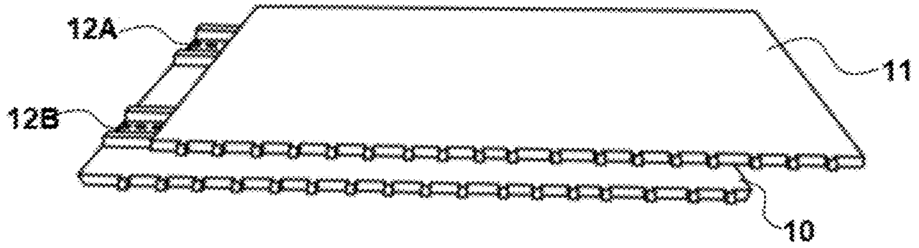
FIG. 1 illustrates a device for the assessment and the treatment of the cervical spine, according to an embodiment of the present invention.

With reference to FIG. 1, therein an embodiment of the proposed system (or device) for the assessment and treatment of the cervical spine is shown, hereinafter (CDAT). The CDAT consists of a sliding platform comprising two plates 10, 11, and two guiding elements 12A, 12B, in particular two linear guides. It must be noted that, in other embodiments, in this case not illustrated, the CDAT can include one single guiding element.

The second plate 11, or movable plate, for supporting the head of the user (or patient) during the performance of the different movements/exercises, shifts or slides relative to the first plate 10, or fixed plate, using the one or more guiding elements 12A, 12B. It should be noted that, in some embodiments, the movable plate 11 can be ergonomic, i.e., not flat, for an improved support of the head.

The CDAT can be placed both on a horizontal surface as well as on a vertical one during the performance of the movements. In the case of performing the exercise on a horizontal surface, the assessment or the treatment is carried out without the influence of gravity. The exercise will be performed with the user in a dorsal decubitus position with the head being resting on the movable plate 11 and the fixed plate 10 is placed on the horizontal surface. In case the exercise is performed on a vertical surface, the assessment or the treatment is carried out with the influence of gravity. The exercise will be performed with the user in sedestation or orthostasis with the head resting on the movable plate 11, and the fixed plate 10 is placed on the vertical surface.

Therefore, the CDAT is an active element that is moved as a result of the force applied by the user on the sliding platform. The purpose of the CDAT is to quantify the shifting and/or the force applied to achieve it. These parameters will allow following up and even planning further treatment. To that end, the CDAT can include different sensors to be able to quantify all movement and force aspects comfortably, quickly, safely and reliably.

Figure 2A:
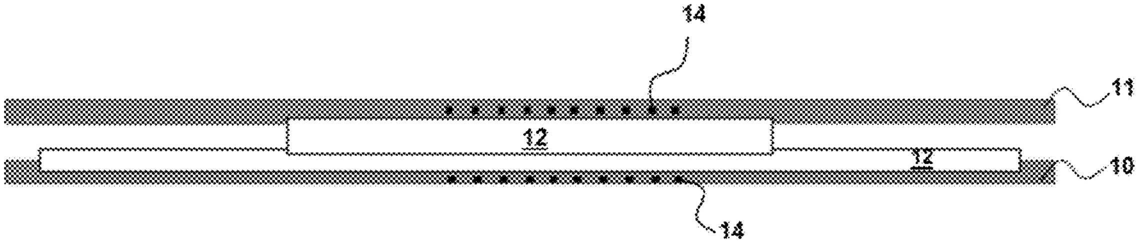
FIGS. 2A and 2B show a side view of the proposed device/system, according to an embodiment of the present invention.
Figure 2B:
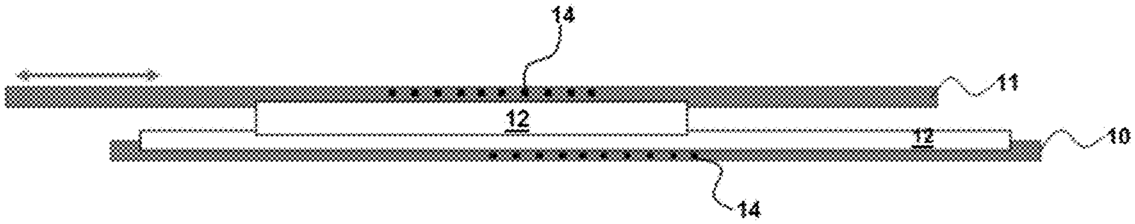

With reference now to FIGS. 2A and 2B, therein another embodiment of the CDAT is shown. In this case, each one of the two plates 10, 11 comprises a number of measurement reference markings 14. Thus, through the use of an imaging element (a camera, for example), not illustrated, as distance sensor, the shifting (see the arrow) of the movable plate 11 on the fixed plate 10 during the one or more exercises can be measured.

In some embodiments, the CDAT includes a distance sensor, for example an optical sensor, an inertial sensor, or a magnetic or capacitive linear encoder, which allows determining the sliding or shifting of the second plate relative to the first plate during the one or more exercises, and to indirectly calculate the range of movement of the cervical spine.

Likewise, in some embodiments, the CDAT, alternatively or complementarily to the previous examples, allows to determine the value of the force exerted with the head during the one or more exercises. To that end, in particular, a pneumatic system has been implemented as a solution. In particular, the pneumatic system includes a two-chamber cylinder 20.

Figure 3:
FIG. 3 schematically illustrates a two-chamber cylinder of the pneumatic system of the present invention, according to an embodiment.

In FIG. 3 an embodiment of the two-chamber cylinder 20 used by the present invention is schematically shown. As observed in the figure, the latter comprises two outlets, one for each one of the cylinder chambers. In each outlet a T-shaped connector is arranged, and a manual flow controller 22 is placed on each side of the T that allows for the aperture, the closure, and/or the air exhaust control of the pneumatic system. In addition, two pressure-measuring instruments 23, for example, pressure gauges, are provided for the estimation of said force. It must be noted that, although a solution with two pressure-measuring instruments 23 is shown in the figure, based on the needs, a single instrument on one or the other side might be used that is interchangeable between sides.

The initial position of the movable plate 11 and of the fixed plate 10 will correspond with the average travel of the two-chamber cylinder 20, in such a way that the two-chamber cylinder 20 will have a uniform travel in both directions.

Two working modes exist based on whether the assessment or the treatment of the user is being carried out. On the other hand, the assessment can include determining the range of movement in flexion and extension and the force of the cervical flexor and extensor musculature.

Assessment:

1. The range of movement will be determined by means of the shifting of the movable plate 11 on the fixed one 10. To that end, several valves of the two-chamber cylinder 20 will be open, allowing the two-chamber cylinder 20 to exhaust the air without resistance at the same time as the user performs the movement of the upper cervical spine.
2. The force of the deep cervical musculature will be determined by means of the pressure changes produced in either chamber. The user will perform a flexion or extension movement depending on the musculature to be assessed, which will translate into a pressure change in the chambers of the pneumatic system. To that end, the manual flow controllers 22 and several valves of the one or more pressure-measuring instruments 23 will be closed, in such a way that the pneumatic system will not be able to exhaust the air and, based on the movement of the user, it will translate into a rise or drop of the pressure in either chamber. This pressure change will be recorded by the one or more pressure-measuring instruments 23.

Treatment:

1. The resistance offered by the system to the movement both towards flexion and towards extension can be adjusted. Using the manual flow controllers 22, the incoming or outgoing airflow can be adjusted. Said airflow will be proportional to the opposing resistance.

The two-chamber cylinder 20 used can be guided or non-guided 20A.

Figure 4:
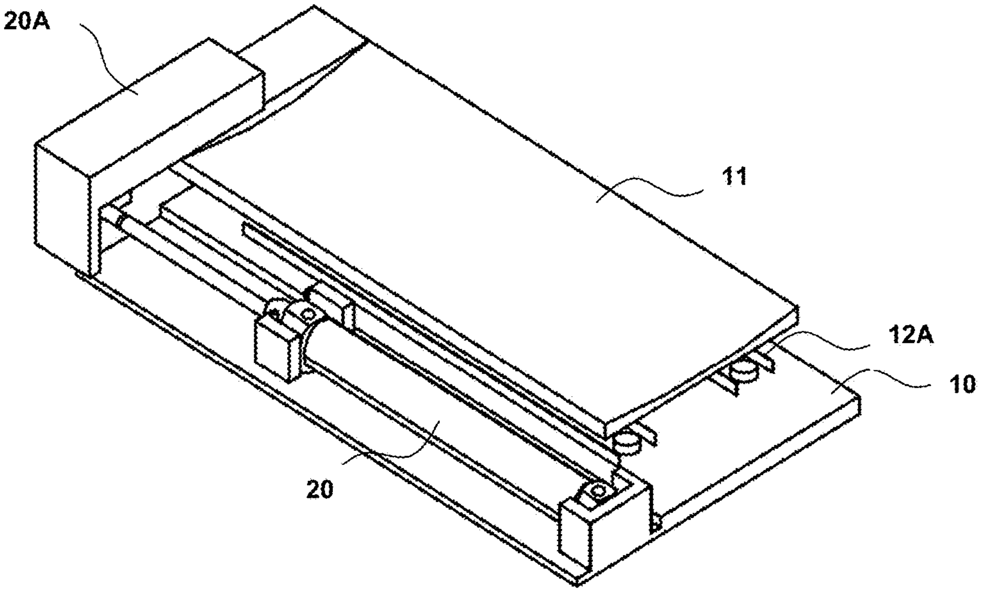
FIG. 4 illustrates another embodiment of the proposed device/system, in this case including a non-guided two-chamber cylinder.

In FIG. 4 an example of a non-guided two-chamber cylinder 20A is shown. As seen in the figure, the cylinder 20 is arranged in or on an end of the fixed plate 10, and a movable extension 20A of the cylinder is connected to the movable plate 11.

Alternatively, in a particular case where a guided two-chamber cylinder is used, the cylinder itself will carry out two actions: the first one will be as a guiding element of the sliding platform and the second one will be as a part of the pneumatic circuit. The guided two-chamber cylinder will be connected both to the fixed plate 10 and to the movable one 11.

In another, not illustrated, embodiment, the CDAT comprises a distance sensor and an electronic unit, for example a microcontroller and the necessary electronics, adapted and configured to acquire the information from the sensor (or sensors) and transmit the determined distance parameter, for example, to a remote computing device, among others, with software media.

The measurement of the sliding of the movable plate 11 on the fixed one can be carried out either by an optical distance sensor, or an inertial sensor, or a linear encoder (the choice of either sensor will be made depending on the needs and on its particular use). In both cases, the chosen distance sensor will be placed on the sliding platform itself next to the one or more guides 12A, 12B.

In particular, the optical sensor includes a lighting source (emitter) and a photodetector (receptor). The optical sensor is located in or on the fixed plate 10 and on the movable plate 11 a reflective surface is located, preferably aligned with the optical sensor, to reflect the light beam emitted by the optical sensor. The distance will be recorded depending on the shift between the optical sensor and the reflective surface. On the other hand, in case a linear encoder is used, this will be located in or on the fixed plate 10, and a magnetic strip will be located on the movable plate 11. The distance will be recorded based on the location where the sensor is found relative to the magnetic strip.

The information collected by the one or more distance sensors will be recorded by the microcontroller and will be transmitted to said computing device via Wi-Fi, Bluetooth, or by a series cable (SPI, I2C, UART). The software media can be implemented by a computer program or by a phone application (APP).

With the CDAT of this embodiment, the user must actively perform the movement. It is possible that the therapist carrying out the assessment or the treatment along with the user can help or hinder the movement of the movable plate 11 accompanying or impeding the movement.

As previously described, the force applied by the user on the device can be estimated by a pressure gauge 23 and a pneumatic system. In addition, the pneumatic system makes it possible to implement a working mode where the user can be helped to perform the movement (active-assisted movement), to perform the movement autonomously (active movement), and even to perform it in a resisted manner (resisted movement). In some embodiments a series of sensors can be integrated for determining the force by means of the signal that the pressure sensors record through the monitoring of the pressure in one or both chambers of the two-chamber cylinder 20, allowing to obtain a continuous signal of the pressure values during each movement. Characteristics such as the peak value, the maximum sustained pressure, and other aspects of the curve morphology will be obtained from this curve.

In some embodiments, the CDAT, in addition to said distance sensor, and, optionally, said electronic unit, can include a pneumatic system which, depending on the embodiment, can be formed by a two-chamber cylinder 20, flow control valves 26A, 26B, pressure sensors 25, and/or an air pump 30. The pneumatic system can be opened, closed, and pressure can also be injected to it.

Figure 5:
FIGS. 5 and 6 illustrate other embodiments of the pneumatic system used by the present invention.

FIG. 5 illustrates an embodiment of the above pneumatic system. In this case, a two-chamber cylinder 20, guided or non-guided, has an outlet for each one of its chambers. A T-shaped connector is arranged in this outlet, much like in the example of FIG. 3. A manual flow controller 22 and a positive absolute or differential pressure sensor 25 are arranged on either side of the T. Therefore, in this case the pneumatic system forms a passive flow control system.

The initial position of the movable plate 11 and of the fixed one 10 will correspond with the average travel of the two-chamber cylinder 20, in such a way that the cylinder will have a uniform travel in both directions. Two working modes exist based on whether the assessment or the treatment of the user is being carried out. On the other hand, the assessment will include determining the range of movement in flexion and extension, and the force of the cervical flexor and extensor musculature.

Assessment:

1. The range of movement will be determined by means of the shifting of the movable plate 11 on the fixed one 10. To that end, the valves of the cylinder 20 will be open, allowing the latter to exhaust the air without resistance, at the same time as the user performs the movement of the upper cervical spine.
2. The force of the deep cervical musculature will be determined by means of the pressure changes produced in either chamber, the user will perform a flexion or extension movement depending on the musculature to be assessed and this will translated into a pressure change in the chambers of the pneumatic system. To that end, the manual flow controllers 22 will be closed, in such a way that the pneumatic system will not be able to exhaust the air and based on the movement of the user will translate into a rise or drop of the pressure in either chamber. This pressure change will be recorded by the pressure sensors 25.

Treatment:

1. The resistance offered by the system to the movement both towards flexion and towards extension can be adjusted. By means of the manual flow controllers 22, the incoming or outgoing airflow can be adjusted, said airflow being proportional to the opposing resistance.

Figure 6:
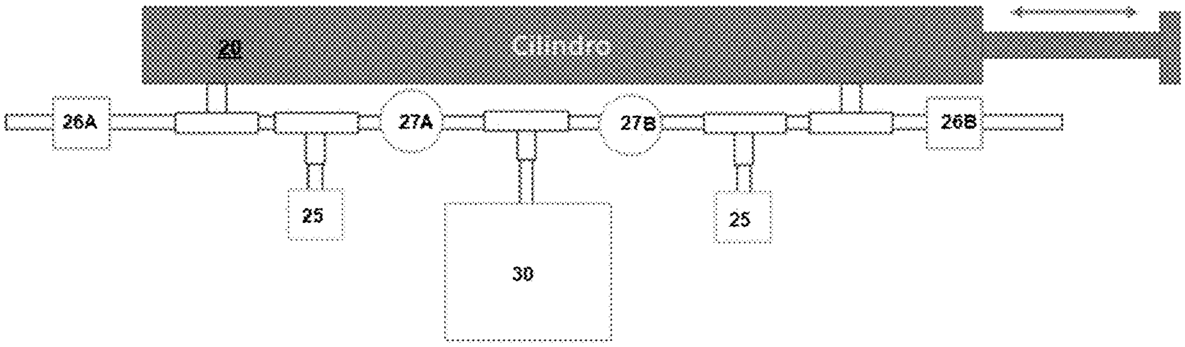

FIG. 6 illustrates another embodiment of the above pneumatic system. In this case, a two-chamber cylinder 20, guided or non-guided, has an outlet for each one of its chambers. A T-shaped connector is arranged in each outlet. A valve 26A, 26B, and a pressure sensor 25 (in the particular case and based on the needs, a single differential pressure sensor can be used) are located on either of the T. A new aperture/closure valve 27A, 27B is located on the other side of the pressure sensor 25, which will be connected to an air pump 30 by means of another T. Therefore, in this case the pneumatic system forms a pneumatic actuation active system by means of said air pump 30.

The initial position of the movable plate 11 and of the fixed one 10 will correspond with the average travel of the two-chamber cylinder 20, in such a way that the cylinder will have a uniform travel in both directions. Two working modes exist based on whether the assessment or the treatment of the user is being carried out. The assessment mode will include determining the range of movement in flexion and extension, the force of the cervical flexor and/or extensor musculature and the ability to carry out a differential diagnosis. To that end, the cooperation of a physical therapist will be necessary. The treatment mode will allow performing an active exercise, an active-assisted exercise, and a resisted exercise.

Assessment:

1. The range of movement will be determined by means of the shifting of the movable plate 11 on the fixed one 10. To that end, the valves of the two-chamber cylinder will be open allowing the latter to exhaust the air without resistance, at the same time as the user performs the movement of the upper cervical spine.
2. The force of the deep cervical musculature will be determined by means of the pressure changes produced in either chamber. The user will perform a flexion or extension movement depending on the musculature to be assessed, and this will translate into a pressure change in the chambers of the pneumatic system. To that end, the valves 26A, 26B, 27A, 27B will be closed, in such a way that the pneumatic system will not be able to exhaust the air and, based on the movement of the user, it will translate into a rise or drop of the pressure in either chamber. This pressure change will be recorded by the pressure sensors 25.
3. The differential diagnosis will be carried out by means of the separate assessment of the active movement and of the passive movement of the upper cervical spine. The user will perform an active movement on the platform towards the flexion or extension of the upper cervical spine, until symptoms appear or the range of movement available in his or her spine ends. In this case, the valves are open, allowing for the shifting movement of the movable plate 11 on the fixed one 10.

Subsequently, the physical therapist carrying out the assessment will indicate to the device the shift that must be performed depending of the shift actively performed previously by the user being assessed. To that end, the valves 26A and 27B will be closed and the valves 27A and 26B will be open. The air pump 30, by injecting air into the selected chamber, will shift the movable plate 11 on the fixed one 10, resulting in a passive movement of the head (the valves will be selected based on the movement of the head previously assessed). An observation will be made as to whether the user has more travel passively, or the pain sensation changes, or if, on the contrary, whether the user has the same range of movement and perceives the same pain sensation. This working mode allows discriminating whether the pain originates from passive structures (capsule and ligaments) or from active structures (musculature); in addition, an observation can be made whether an increase or decrease of the range of movement exists by comparing the active assessment with the passive one. Again, this allows discriminating whether the range of movement is limited by passive or active structures.

Treatment:

1. Active-assisted: In this case, the platform will help the user to perform the movement. The extent of help can be determined at all times and it will assist the user during the entire travel or will help him or her in specific moments of the travel. The level of assistance can be determined constantly or occasionally, at a specific time. To that end, based on the direction in which the movement requires assistance, valves 26A and 27B will be closed and valves 26B and 27A will be open. Air will be injected into the pneumatic circuit by means of the air pump 30, which will allow the movable plate 11 to slide autonomously on the fixed one 10 and the user can apply less force to perform the movement. In case the opposite shifting of the movable plate 11 is deemed to require assistance, the valves that were closed will now be open, and the ones that were open will now be closed. More or less air can be injected by means of the air pump 30 and the level of assistance will be determined therewith.
2. Active: In the active mode, the valves will be open and the user will move the platform autonomously without any type of help or resistance.
3. Active-resisted: In this case, the platform will hinder the user from performing the movement by opposing resistance to the exercise being performed on the sliding platform. The degree of difficulty can be determined at all times and a constant resistance can be applied during the entire travel, or resistance can variably hinder the shifting at specific times of the travel. To that end, based on the direction in which the movement requires resistance, valves 26A and 27B will be closed and valves 26B and 27A will be open. Air will be injected into the pneumatic circuit by means of the air pump 30, which will result in the movable plate 11 sliding autonomously on the fixed one 10 and the user will have to apply greater force to move the movable plate 11. In case the opposite shifting of the movable plate 11 is deemed to require resistance, the valves that were closed will now be open, and the ones that were open will now be closed. More or less air can be injected by means of the air pump 30 and the level of resistance will be determined therewith.

In the previous examples, if the two-chamber cylinder is non-guided, its arrangement on the sliding platform can be similar to that described in FIG. 4. The measurement of the sliding of the movable plate 11 on the fixed one 10 will be carried out by means of an optical sensor, an inertial sensor or a linear encoder. In both cases, in particular, the chosen distance sensor will be placed on or within the sliding platform next to the one or more guiding elements 12A, 12B. The pressure changes generated in the pneumatic system as the sliding platform moves in either direction will be perceived by the pressure sensors 25.

The information collected by the different sensors will be recorded by a microcontroller of the electronic unit and will be transmitted to a computing device via Wi-Fi, Bluetooth, or by means of a series cable (SPI, I2C, UART).

In some embodiments, the movable plate 11 can be covered, at least on the surface for supporting the head, with a mechanical pressure-sensitive conductive sheet. This way, the CDAT will further make it possible to know the sliding value and/or the exerted force value, if the user is in contact with the second plate 11, if he or she loses contact or even if he or she applies a force against the device.

An expert in the field will appreciate that the previous embodiments have been solely described in an exemplary and non-limiting sense, and that various alterations and modifications are possible without departing from the scope of the invention as defined in the attached claims. Various modifications of the previously described detailed designs are possible; for instance, variations can exist in the shape, the size, the arrangement (that is, a single unitary component or two separate components), the assembly, or the like.

What is claimed is:

1. A system for the assessment and treatment of the cervical spine, comprising:

a sliding platform formed by two plates, a first plate, fixed, which is arranged on a surface when a user is performing a head movement exercise, and a second plate, movable, for supporting the head of the user during said exercise, the two plates being coupled together by at least one guiding element;

and at least one of:

a distance sensor for determining a sliding value of the second plate relative to the first plate during the exercise; and a pneumatic system for determining a value of a force exerted with the head during the exercise, the pneumatic system including a two-chamber cylinder.

2. The system according to claim 1, wherein each one of the two plates includes, embedded or embossed therein, a number of measurement reference markings.

3. The system according to claim 1, wherein the distance sensor comprises an imaging element.

4. The system according to claim 1, wherein the distance sensor comprises an optical sensor.

5. The system according to claim 4, wherein the optical sensor comprises a light-emitting element and a light-receiving element, wherein the light-emitting element is arranged in or on the first plate and the light-receiving element is arranged in or on the second plate.

6. The system according to claim 1, wherein the distance sensor comprises a magnetic or capacitive linear encoder, or an inertial sensor.

7. The system according to claim 6, wherein the linear encoder comprises a sensing element and a magnetic/capacitive strip, wherein the sensing element is arranged in or on the first plate and the magnetic strip is arranged in or on the second plate.

8. The system according to claim 7, further comprising a control electronic unit configured for collecting the determined sliding value and transmitting it to a computing device.

9. The system according to claim 1, wherein the two-chamber cylinder comprises an outlet for each one of the chambers, each outlet including a "T"-shaped connector, and one of the pathways of each "T"-shaped connector including a manual flow controller.

10. The system according to claim 9, wherein the pneumatic system further comprises at least one pressure-measuring instrument operatively connected to another of the pathways of the "T"-shaped connector.

11. The system according to claim 1, wherein the at least one guiding element is formed by the two-chamber cylinder.

12. The system according to claim 1, comprising the distance sensor, the pneumatic system and, in addition, a control electronic unit, wherein the distance sensor comprises an optical sensor, an inertial sensor, or a magnetic or capacitive linear encoder, and the pneumatic system further comprises one or more of: a pressure sensor, a flow control valve and an air pump.

13. The system according to claim 12, wherein the two-chamber cylinder comprises an outlet for each one of the chambers, each outlet including a "T"-shaped connector, and one of the pathways of each "T"-shaped connector including a manual flow controller and another of the pathways including a pressure sensor.

14. The system according to claim 12, wherein the two-chamber cylinder comprises an outlet for each one of the chambers, each outlet including a "T"-shaped connector, referred to as first and second "T"-shaped connectors, wherein one of the pathways of the first and second "T"-shaped connectors includes a flow control valve and another of the pathways of the first and second "T"-shaped connectors includes another "T"-shaped connector, referred to as third and fourth "T"-shaped connectors, wherein one of the pathways of the third and fourth "T"-shaped connectors includes a pressure sensor and another of the pathways of the third and fourth "T"-shaped connectors includes an aperture/closure valve operatively connected to an air pump.

15. The system according to claim 1, wherein the second plate is covered, at least on a surface for supporting the head, with a mechanical pressure-sensitive conductive sheet.

16. The system according to claim 1, wherein the two plates of the sliding platform have planar geometry.

17. The system according to claim 1, wherein the two plates have identical dimensions.

* * * * *